United States Patent
Shin (10) Patent No.: US 9,881,513 B2
(45) Date of Patent: Jan. 30, 2018

(54) SYSTEM AND METHOD FOR SIMULATING REAL-TIME VISUALIZABLE ELECTRONIC WARFARE

(71) Applicant: Agency for Defense Development, Yuseong-gu, Daijeon (KR)

(72) Inventor: Dong-Cho Shin, Daijeon (KR)

(73) Assignee: Agency for Defense Development, Daejeon (KR)

( * ) Notice: Subject to any disclaimer, the term of this patent is extended or adjusted under 35 U.S.C. 154(b) by 315 days.

(21) Appl. No.: 14/850,386

(22) Filed: Sep. 10, 2015

(65) Prior Publication Data
US 2016/0092619 A1   Mar. 31, 2016

(30) Foreign Application Priority Data
Sep. 25, 2014  (KR) .......................... 10-2014-0128300

(51) Int. Cl.
 *G09B 9/00* (2006.01)
 *F41G 7/00* (2006.01)
(52) U.S. Cl.
 CPC ............. *G09B 9/003* (2013.01); *F41G 7/006* (2013.01)
(58) Field of Classification Search
 CPC .. G09B 9/003; G09B 9/16; G09B 9/40; F41A 33/00; F41A 33/02; G01S 7/003; F41G 7/24; F41G 7/303; F41G 3/26; F41G 7/006; F42B 99/00
 See application file for complete search history.

(56) References Cited

U.S. PATENT DOCUMENTS

| | | | | |
|---|---|---|---|---|
| 3,169,727 A | * | 2/1965 | Schroader et al. | ........ F41G 7/24 |
| 3,567,163 A | * | 3/1971 | Kepp et al. | ............. F41G 7/303 |
| 4,424,038 A | * | 1/1984 | Tingleff et al. | .......... G09B 9/40 |
| 4,552,533 A | * | 11/1985 | Walmsley | ................ G09B 9/40 |
| 4,585,418 A | * | 4/1986 | Stickel | ................... G09B 9/003 |
| 4,739,329 A | * | 4/1988 | Ward et al. | ............. G01S 7/003 |
| 5,228,854 A | * | 7/1993 | Eldridge | ................... F41G 3/26 |
| 5,378,155 A | * | 1/1995 | Eldridge | ................... F41G 3/26 |
| 5,379,966 A | * | 1/1995 | Simeone et al. | ........ F41G 7/303 |
| 5,428,530 A | * | 6/1995 | Brown et al. | .......... G09B 9/003 |

(Continued)

FOREIGN PATENT DOCUMENTS

| | | | | |
|---|---|---|---|---|
| FR | 2772908 A1 | * | 6/1999 | ............. F41G 7/006 |
| KR | 20100052698 A | | 5/2010 | |

*Primary Examiner* — Bernarr E Gregory
(74) *Attorney, Agent, or Firm* — TraskBritt (57) ABSTRACT

Disclosed herein is a system and method for simulating real-time visualizable electronic warfare. The system includes a location calculation unit for calculating location coordinates of the aircraft and the missile for each frame according to a display frame rate, a display unit for visualizing, for each frame, movement of the aircraft and the missile depending on the location coordinates thereof, a precise tracking unit for, when a relative distance between the aircraft and the missile is less than a dangerous distance, dividing an interval between a current frame and a subsequent frame into sub-intervals based on the display frame rate, and sampling locations of the aircraft and the missile, and a proximity fuse control unit for processing the missile to explode when a relative distance between sampled locations of the aircraft and the missile, is less than or equal to a maximum explosible distance of a proximity fuse of the missile.

11 Claims, 5 Drawing Sheets

(56) References Cited

U.S. PATENT DOCUMENTS

| | | | |
|---|---|---|---|
| 6,561,809 B1* | 5/2003 | Lynch et al. | F41G 3/26 |
| 8,714,979 B2* | 5/2014 | Leonard et al. | G09B 9/003 |
| 2007/0026364 A1* | 2/2007 | Jones et al. | F41A 33/02 |
| 2008/0206718 A1* | 8/2008 | Jaklitsch et al. | F41A 33/00 |
| 2012/0156653 A1* | 6/2012 | Wokurka | G09B 9/16 |

* cited by examiner

SYSTEM AND METHOD FOR SIMULATING REAL-TIME VISUALIZABLE ELECTRONIC WARFARE

CROSS-REFERENCE TO RELATED APPLICATION

This application claims the benefit of Korean Patent Application No. 10-2014-0128300 filed Sep. 25, 2014, the disclosure of which is hereby incorporated herein in its entirety by this reference.

TECHNICAL FIELD

The present invention relates generally to a system and method for simulating real-time visualizable electronic warfare, which can simulate electronic warfare in real time and, more particularly, to a system and method for simulating real-time visualizable electronic warfare, which can simulate a situation, in which an aircraft and a missile encounter each other, without causing an error when the aircraft and the missile encounter each other in a period between frames.

BACKGROUND

When a large-scale battlefield situation is simulated, the amount of data to be processed is very large, and thus a high-performance computer, for example, a super computer or the like, is used.

Recently, with the development of computer performance, a small-scale battlefield situation may be simulated on a server basis, and current technology has reached a level such that a simulation procedure can be displayed in real time.

Since technology for visualizing and processing a real-time simulation procedure processes data in conformity with a display frame, the amount of data to be processed may be restricted to some degree, thus enabling a video to be processed in real time. In most simulation situations, an interval between frames is narrow compared to the movement speeds of combat objects, for example, soldiers, tanks, and war vessels, and thus there is no particular problem when processing the trajectories of combat objects in real time for each frame.

However, in some special situations, there may occur a case where it is impossible to obtain precise simulation results for a situation occurring in an interval between frames.

For example, if a situation, in which objects moving at very high movement speeds encounter each other, is simulated, the objects may move a long distance even during a time corresponding to an interval between frames, thus making it difficult to obtain precise simulation results.

Figure 1A:
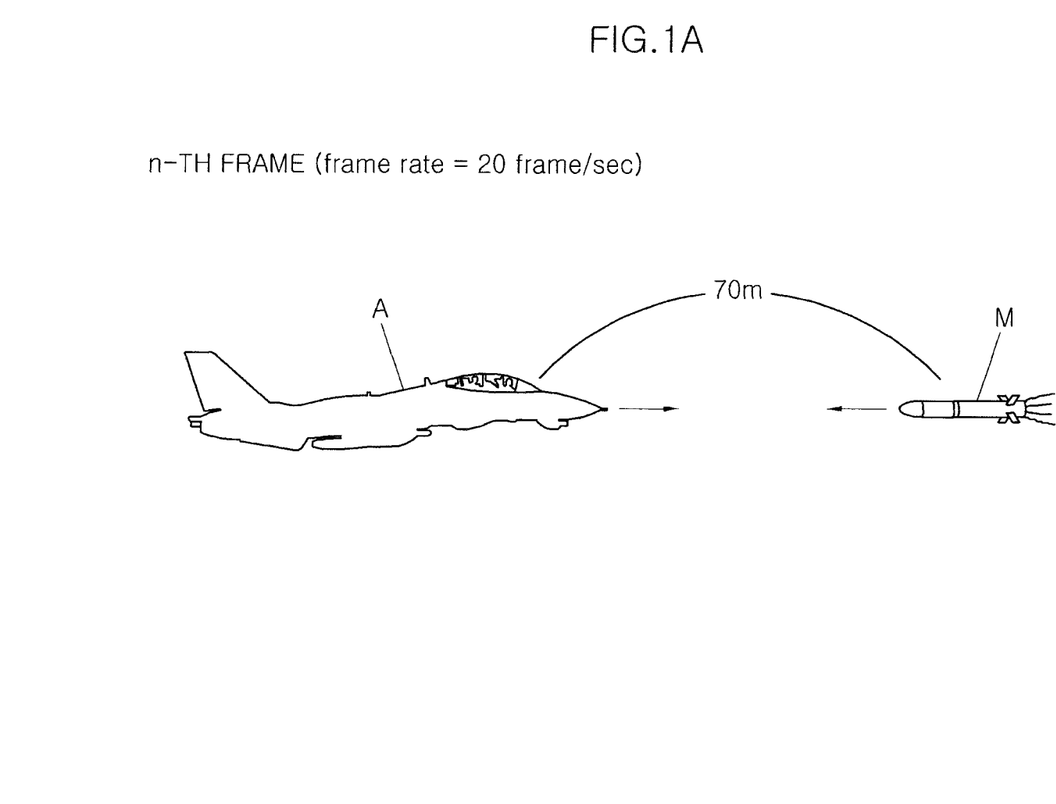
FIGS. 1A and 1B are schematic diagrams showing a situation in which an aircraft and a missile encounter each other when a relative speed between the aircraft and the missile is higher than an interval between display frames in conventional technology.
Figure 1B:
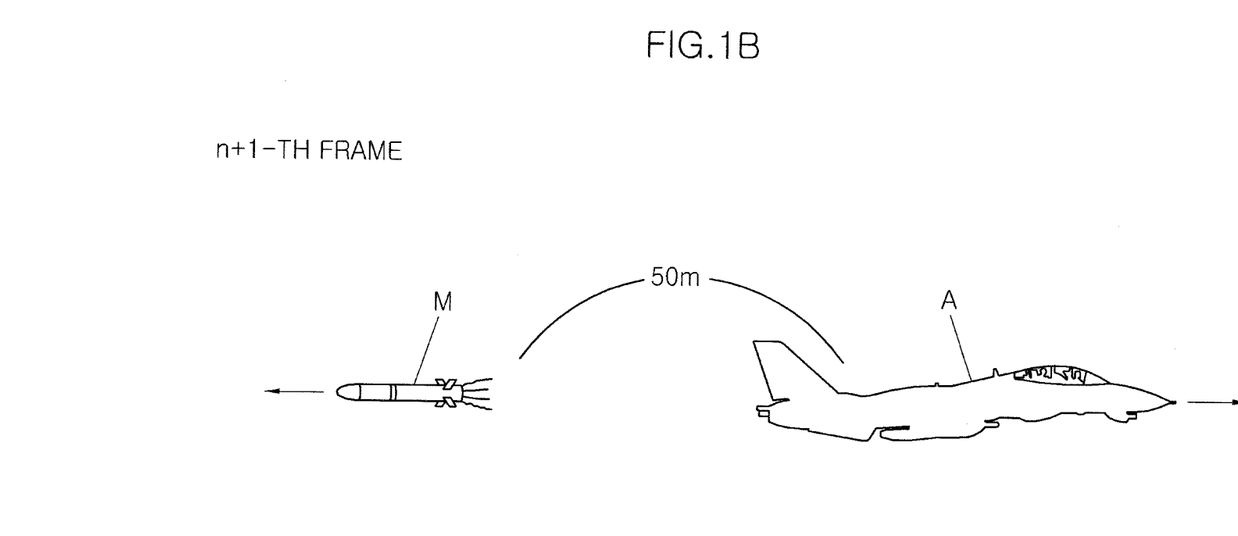

FIGS. 1A and 1B illustrate a case where aircraft A and antiaircraft missile M are flying in opposite directions. Since the aircraft A and the missile M move at very high movement speeds, there is a concern that, even if a situation in which the aircraft and the missile encounter each other occurs in an interval between frames (e.g., between an n-th frame and an n+1-th frame), the situation may not be simulated. As shown in FIG. 1A, in the situation of simulation performed at a rate of 20 frames per second, if it is assumed that the aircraft A is flying at Mach 3 and the missile M is flying at Mach 5, a relative speed between the aircraft A and the missile M is Mach 8, and the aircraft A and the missile M relatively move a distance of about 120 m whenever one frame is increased. That is, when Mach 1 is simplified to 300 m/s, and a time of $\frac{1}{20}$ seconds that is an interval between frames is applied, it can be seen from such calculation that '8×300 m/s×$\frac{1}{20}$s' is obtained, and the aircraft A and the missile M perform a relative motion by 120 m per frame. FIGS. 1A and 1B illustrate a state in which the aircraft A and the missile M move a distance of 120 m during the progress of one frame. In this case, when the aircraft A and the missile M are far away from each other by 70 m in an n-th frame (see FIG. 1A), they are far away from each other by 50 m after crossing each other in an n+1-th frame that is a subsequent frame (see FIG. 1B). When a relative distance between the aircraft A and the missile M in the n-th frame and the n+1-th frame exceeds the maximum explosible distance of the proximity fuse of the missile M, the movement speeds of the aircraft A and the missile M are higher than the interval between the frames, so that there is an error that prevents simulation of a situation where the aircraft and the missile cross each other.

For example, when the maximum explosible distance of the proximity fuse of the missile M is 30 m, and the aircraft A and the missile M are approaching each other by a distance of 10 m between the n-th frame and the n+1-th frame, the aircraft A and the missile M are simulated to be far away from each other by a distance of 70 m in the n-th frame and by a distance of 50 m in the n+1-th frame. Thus, it is impossible to determine whether the aircraft A and the missile M will encounter each other.

Here, the missile M is intended to shoot down the aircraft A, and contains a proximity fuse installed therein so that, even if the missile M does not directly hit a target, the missile explodes when the target falls within the range of a preset distance.

Therefore, in FIG. 1, when the aircraft A and the missile M encounter each other between the n-th frame and the n+1-th frame, it is impossible to determine whether the aircraft A and the missile M have approached each other within the operable range of the proximity fuse and how close they have approached each other even if the aircraft A and the missile M approach each other during an interval between the frames. That is, since the relative distance between the aircraft A and the missile M is generally greater than the operable range of the proximity fuse, a problem arises in that it is difficult to determine whether two objects will encounter each other.

BRIEF SUMMARY

Accordingly, the present invention has been made keeping in mind the above problems occurring in the prior art, and an object of the present invention is to provide a system and method for simulating real-time visualizable, electronic warfare, which divide an interval between frames into sub-intervals narrower than the interval and detect the locations of two objects moving at very high speeds when the two objects are approaching each other within a preset range, thus determining whether the two objects have encountered each other.

In accordance with an aspect of the present invention to accomplish the above object, there is provided a system for simulating real-time visualizable electronic warfare, the system simulating and displaying a situation in which a virtual aircraft and a virtual missile encounter each other, including a location calculation unit for calculating location coordinates of the aircraft and the missile for each frame according to a display frame rate, a display unit for visualizing, for each frame, movement of the aircraft and the missile depending on the location coordinates thereof, a precise tracking unit for, when a relative distance between the aircraft and the missile is less than a dangerous distance that is a distance in a current frame that deviates from an explosible distance of a proximity fuse of the missile upon making a transition from the current frame to a subsequent frame, dividing an interval between the current frame and the subsequent frame into a plurality of sub-intervals based on the display frame rate, and sampling locations of the aircraft and the missile, and a proximity fuse control unit for processing the missile to explode when a relative distance between the locations of the aircraft and the missile, sampled by the precise tracking unit, is less than or equal to a maximum explosible distance of the proximity fuse of the missile.

The dangerous distance may be determined by the following equation:

$$D = \frac{V_a + V_m}{FR} - r$$

where $V_a$ denotes a maximum speed of the aircraft in data, $V_m$ denotes a maximum speed of the missile in data, FR denotes the display frame rate, and r denotes the maximum explosible distance of the proximity fuse of the missile.

The dangerous distance may be determined by the following equation:

$$D = \frac{V_{cfa} + V_{cfm}}{FR} - r$$

where $V_{cfa}$ denotes a current speed of the aircraft, $V_{cfm}$ denotes a current speed of the missile, FR denotes the display frame rate, and r denotes the maximum explosible distance of the proximity fuse of the missile.

The proximity fuse control unit may approximate sample coordinates of the aircraft and the missile at a time at which the relative distance is a minimum and other sample coordinates of the aircraft and the missile at a time adjacent to the time having the minimum relative distance, and then determine whether a distance between the trajectories of the aircraft and the missile is less than or equal to the maximum explosible distance of the proximity fuse of the missile.

The system may further include a scenario provision unit having data and combat situation scenarios of the aircraft and the missile in conformity with a predetermined simulation scenario.

The system may further include a user manipulation unit for manually controlling movement of the aircraft and the missile.

In accordance with another aspect of the present invention to accomplish the above object, there is provided a method for simulating real-time visualizable electronic warfare, the method simulating and displaying a situation in which a virtual aircraft and a virtual missile encounter each other, including a) calculating and displaying locations of the aircraft and the missile for each frame according to a display frame rate, and then visualizing movement of the aircraft and the missile, b) determining whether a relative distance between the aircraft and the missile in a current frame is greater than a maximum explosible distance of a proximity fuse of the missile, c) if the relative distance is greater than the maximum explosible distance of the proximity fuse of the missile, determining whether the relative distance between the aircraft and the missile is less than a preset dangerous distance, d) if the relative distance is greater than the maximum explosible distance of the proximity fuse of the missile and is less than the dangerous distance, dividing an interval between the current frame and a subsequent frame into preset sub-intervals, and sampling locations of the aircraft and the missile, e) determining whether a relative distance between the sampled locations of the aircraft and the missile is less than or equal to the maximum explosible distance of the proximity fuse of the missile, and f) if it is determined at e) that the relative distance is less than or equal to the maximum explosible distance of the proximity fuse of the missile, processing the missile to explode in a frame subsequent to the frame in which it is determined that the relative distance is greater than the maximum explosible distance of the proximity fuse of the missile and is less than the dangerous distance.

The method may further include simulating the missile to explode if it is determined at b) that the relative distance between the aircraft and the missile is not greater than the maximum explosible distance of the proximity fuse of the missile.

The dangerous distance may be determined by the following equation:

$$D = \frac{V_a + V_m}{FR} - r$$

where $V_a$ denotes a maximum speed of the aircraft in data, $V_m$ denotes a maximum speed of the missile in data, FR denotes the display frame rate, and r denotes the maximum explosible distance of the proximity fuse of the missile.

The dangerous distance may be determined by the following equation:

$$D = \frac{V_{cfa} + V_{cfm}}{FR} - r$$

where $V_{cfa}$ denotes a current speed of the aircraft, $V_{cfm}$ denotes a current speed of the missile, FR denotes the display frame rate, and r denotes the maximum explosible distance of the proximity fuse of the missile.

The method may further include processing the missile to explode in air in conformity with a scenario if it is determined at c) that the relative distance between the aircraft and the missile is equal to or greater than the preset dangerous distance, or at e) that the relative distance between the sampled locations of the aircraft and the missile is greater than the maximum explosible distance of the proximity fuse of the missile.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, a system for simulating real-time visualizable electronic warfare according to the present invention will be described in detail with reference to the attached drawings.

Figure 2:
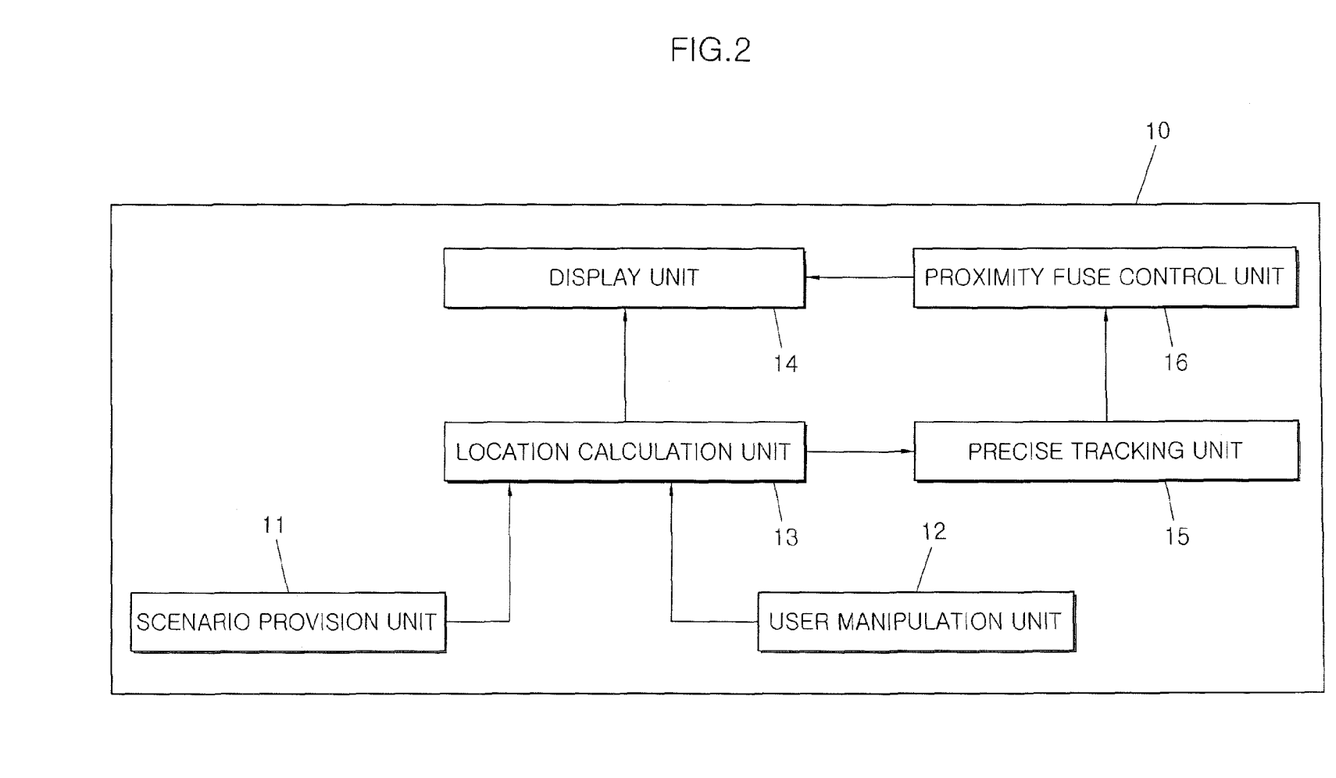
FIG. 2 is a block diagram showing a system for simulating real-time visualizable electronic warfare according to the present invention.

As shown in FIG. 2, a system 10 for simulating real-time visualizable electronic warfare according to the present invention includes a location calculation unit 13, a display unit 14, a precise tracking unit 15, and a proximity fuse control unit 16. The location calculation unit 13 calculates the location coordinates of aircraft A and missile M for each frame depending on a display frame rate. The display unit 14 visualizes the movement of the aircraft A and the missile M depending on the location coordinates for each frame. The precise tracking unit 15 is configured to, when a relative distance between the aircraft A and the missile M is less than a dangerous distance that is a distance in a current frame that deviates from an explosible distance r of a proximity fuse of the missile upon making a transition from the current frame to a subsequent frame, divide an interval between the current frame and the subsequent frame into a plurality of subintervals based on a display frame rate, and sample the locations of the aircraft A and the missile M at the subintervals. The proximity fuse control unit 16 is configured to, if the relative distance between the locations of the aircraft A and the missile M, sampled by the precise tracking unit 15, is less than or equal to the maximum explosible distance of the proximity fuse, process the missile M to explode.

A scenario provision unit 11 allows simulation matching a situation input by a user or made by real-time manipulation of the user to be performed on the assumption of modeling in which data, combat, and situation handling scenarios of objects having various types of combat capabilities are set depending on a predetermined simulation scenario. The objects may be virtual aircraft A, virtual antiaircraft missile M, a virtual radar site, a virtual antiaircraft position, a virtual battle position, etc. For example, when aircraft A handled by the user departs from a departure point and flies to a destination at preset time and speed, the aircraft A is detected using preset data in a virtual radar site at a preset location. A situation, such as the shooting of an antiaircraft missile and a sortie of a resisting combat aircraft, is simulated depending on the scenario, and a background screen or the like for visualization of individual situations is provided by the scenario provision unit 11.

A user manipulation unit 12 selects and manipulates a specific object such as the aircraft A or the missile M. The user manipulation unit 12 may be implemented as a keypad, a mouse or a joystick. Via the user manipulation unit 12, the speed of the object may be controlled, or a hammer manipulation signal or the like may be manually input.

The location calculation unit 13 generates the location coordinates of objects, which are simulated in conformity with real-time visualization, for each frame depending on the display frame rate. The location calculation unit 13 generates the locations of objects for each frame depending on each display frame rate, and connects the locations of corresponding objects between neighboring frames to each other, so that the locations of the objects are represented by their movement trajectories, and thus the objects may be displayed in the form of a video. The locations of the aircraft A and the missile M are calculated for each frame by the location calculation unit 13, so that the aircraft A and the missile M are continuously displayed, thus enabling the movement of the aircraft A and the missile M to be displayed in the form of a video.

The display unit 14 visualizes the background screen generated by the scenario provision unit 11 and the movement of objects depending on the location coordinates of objects generated by the location calculation unit 13 according to the preset frame rate per frame. The display unit 14 is provided as a flat display panel, a beam projector, or the like, and then allows a simulation situation to be visually perceived.

The precise tracking unit 15 is intended to solve the inaccuracy of simulation occurring because the speeds of the aircraft A and the missile M that are moving fast are higher than the frame rate, and is configured to sample the locations of objects, that is, the aircraft A and the missile M, more frequently than the frame rate.

For example, in any one frame, that is, in a current frame, when the relative distance between the aircraft A and the missile M is longer than the maximum explosible distance r of the proximity fuse based on the data of the missile M, and is less than a preset dangerous distance D, the trajectories of the aircraft A and the missile M to the subsequent frame based on coordinates may be frequently sampled depending on a preset sampling rate. That is, since the movement speeds of the aircraft A and the missile M are very high, the above-described problem may occur if the locations of the objects are sampled at a frame interval. Therefore, during an interval in which two objects are expected to encounter each other, that is, in which the relative distance is greater than the maximum explosible distance of the proximity fuse and is less than the dangerous distance D, the locations of the aircraft A and the missile M are sampled at dense intervals. The interval at which the locations of the aircraft A and the missile M are sampled is preset, and may be, for example, 1/20 of the frame interval. In this case, the locations of the aircraft A and the missile M are additionally sampled by 20 times during an interval between the current frame and the subsequent frame at time at which the aircraft A and the missile M are expected to encounter each other. Therefore, when the frame rate is 20 frames per second, the locations of the aircraft A and the missile M are sampled at intervals of 1/400 seconds during the interval in which the objects are expected to encounter each other.

Meanwhile, the dangerous distance D may be determined using the following Equation (1):

$$D = \frac{V_a + V_m}{FR} - r \qquad (1)$$

where $V_a$ denotes the maximum speed of the aircraft in data, $V_m$ denotes the maximum speed of the missile in data, FR denotes a display frame rate, and r denotes the maximum explosible distance of the proximity fuse of the missile.

Meanwhile, a procedure for deriving the dangerous distance D is described below.

Figure 3:
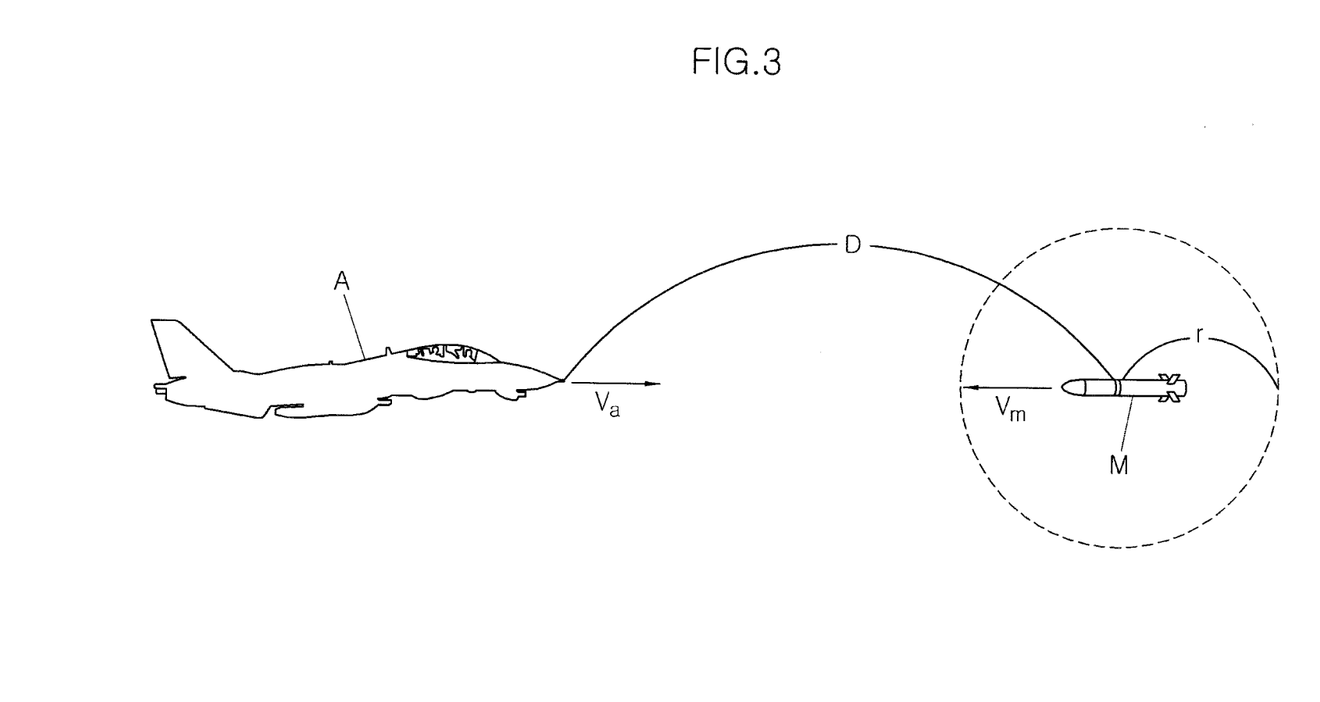
FIG. 3 is a schematic diagram showing a situation in which an aircraft and a missile encounter each other in the system for simulating real-time visualizable electronic warfare according to the present invention.

Referring to FIG. 3, a case where a relative speed between the aircraft A and the missile M is a maximum value denotes a case where the aircraft A and the missile M are moving in opposite directions at respective maximum speeds, and such a case is assumed in the present invention.

First, when the aircraft A and the missile M are approaching and the relative distance between the aircraft A and the missile M, obtained from the current frame, is less than the maximum explosible distance r of the proximity fuse installed, the proximity fuse is processed to normally explode depending on the scenario, and a simulation error occurring when the movement speeds of the two objects do not match the frame rate is prevented.

Therefore, the precise tracking unit 15 is operated only when the relative distance between the aircraft A and the missile M is greater than the maximum explosible distance of the proximity fuse of the missile.

The maximum value $D_{MAX}$ of the relative distance between the aircraft A and the missile M is calculated by $D_{MAX}=(V_a+V_m)/FR$ during a time corresponding to the frame rate.

The dangerous distance, which is the relative distance in the current frame, means a distance in the current frame that deviates from the explosible distance r of the proximity fuse of the missile in the subsequent frame.

Therefore, referring to FIG. 3, the dangerous distance is obtained as given by Equation (1), by adding the explosible distance of the proximity fuse of the missile to the maximum separation distance between the aircraft A and the missile M in the current frame.

In this regard, it means that, when the relative distance between the aircraft A and the missile M in the current frame is greater than the dangerous distance, an error does not occur in the subsequent frame, and when the relative distance falls within the dangerous distance, there is a possibility that an error will occur in the subsequent frame. Furthermore, since this assumes an extreme case where the relative distance is the largest, a possibility that a simulation error will occur is relatively low when the missile M is flying in the direction of the side of the aircraft A, or when the aircraft A and the missile M are not moving at their maximum speeds based on data. Nevertheless, the dangerous distance is determined in consideration of all cases.

Here, the dangerous distance D may be determined in light of the current speeds of the aircraft A and the missile M in the current frame, rather than the maximum speed based on data, as given by the following Equation (2):

$$D = \frac{V_{cfa} + V_{cfm}}{FR} - r \quad (2)$$

where $V_{cfa}$ denotes the current speed of the aircraft, $V_{cfm}$ denotes the current speed of the missile, FR denotes a display frame rate, and r denotes the maximum explosible distance of the proximity fuse of the missile.

As described above, since sampling is performed using only the current speeds of the aircraft A and the missile M by Equation (2), more efficient results may be obtained via only a small number of sampling times.

The proximity fuse control unit 16 is intended to incorporate the results of processing by the precise tracking unit 15 into a display, and is configured to, if the relative distance between the aircraft A and the missile M is less than or equal to the maximum explosible distance of the proximity fuse of the missile depending on the locations of the aircraft A and the missile M generated by the precise tracking unit 15, process the missile M to explode in the subsequent frame and display the results of processing.

In order to detect an error that may occur when the locations of the aircraft A and the missile M are sampled, the proximity fuse control unit 16 may approximate the trajectories of the aircraft A and the missile M between sample coordinates, at a time at which the relative distance is the minimum, and neighboring sample coordinates adjacent thereto, and may determine whether a distance between the approximated trajectories is less than or equal to the maximum explosible distance r of the proximity fuse of the missile. That is, it is determined whether the aircraft A and the missile M have entered an explosible range from locations on neighboring trajectories around sampling coordinates appearing when the aircraft and the missile become closest to each other.

Figure 4:
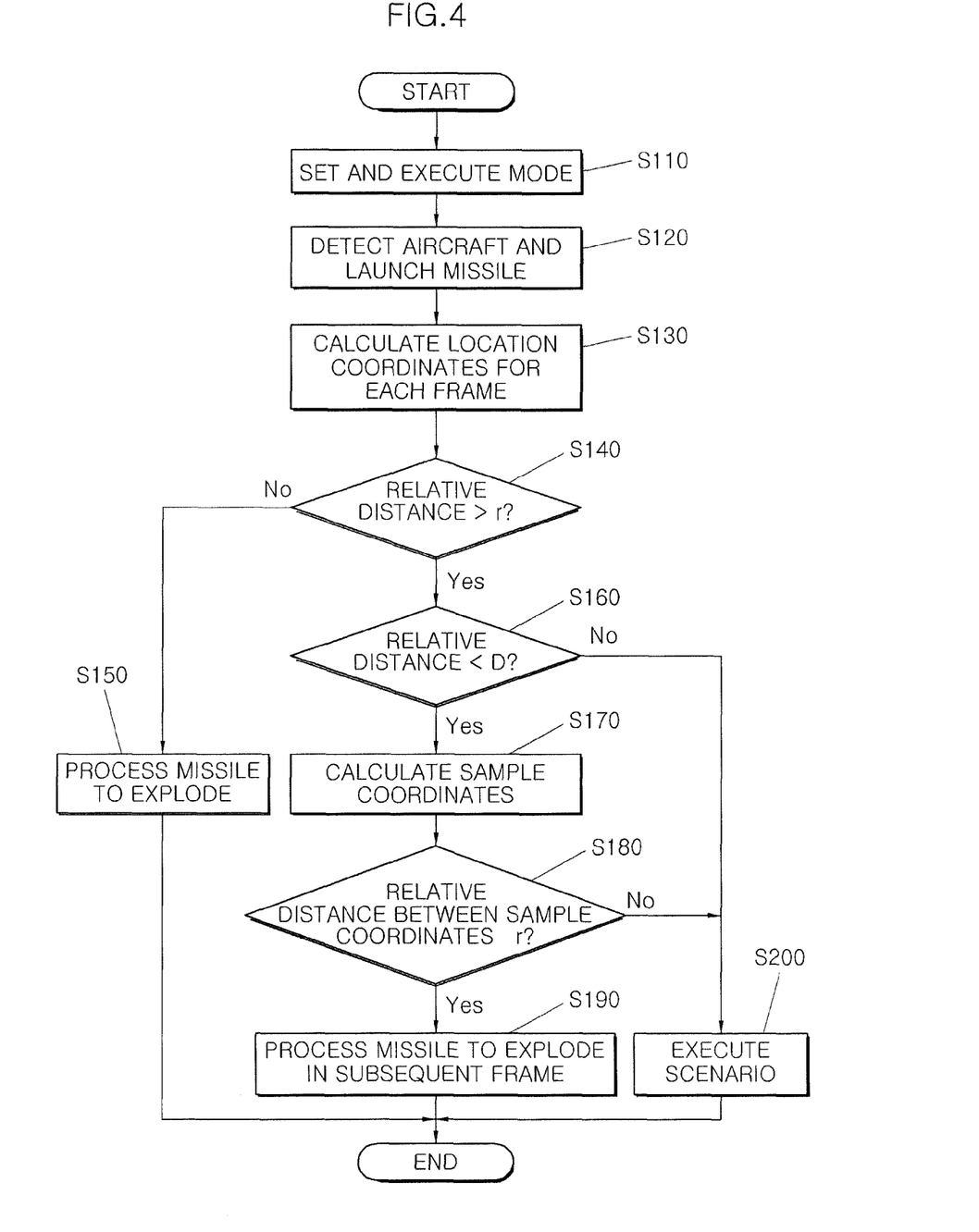
FIG. 4 is a flowchart showing a method for simulating real-time visualizable electronic warfare according to the present invention.

Below, a method for simulating real-time visualizable electronic warfare according to the present invention will be described in detail with reference to FIG. 4.

The method for simulating real-time visualizable electronic warfare according to the present invention includes frame-based location calculation step S130, missile explosion determination step S140, encounter or non-encounter determination step S160, sample coordinate calculation step S170, encounter possibility determination step S180, and missile explosion processing step S190. More specifically, at the frame-based location calculation step S130, the locations of aircraft A and missile M are calculated for each frame depending on the display frame rate and are displayed, so that the movement of the aircraft A and the missile M is visualized. At the missile explosion determination step S140, it is determined whether a relative distance between the aircraft A and the missile M is greater than the maximum explosible distance r of the proximity fuse of the missile M in any one frame. At the encounter or non-encounter determination step S160, if the relative distance is greater than the maximum explosible distance r of the proximity fuse of the missile M, it is determined whether the relative distance between the aircraft A and the missile M is less than a preset dangerous distance D. At the sample coordinate calculation step S170, if the relative distance is greater than the maximum explosible distance r of the proximity fuse of the missile M and is less than the dangerous distance D, an interval between the frame, in which it is determined that the relative distance is greater than the maximum explosible distance r of the proximity fuse of the missile M and is less than the dangerous distance, and a subsequent frame is divided into preset sub-intervals, and the locations of the aircraft A and the missile M are sampled. At the encounter possibility determination step S180, it is determined whether the relative distance between the sampled locations of the aircraft A and the missile M is less than or equal to the maximum explosible distance r of the proximity fuse of the missile. At the missile explosion processing step S190, if it is determined at the encounter possibility determination step S180 that the relative distance is less than or equal to the maximum explosible distance r of the proximity fuse of the missile, the missile M is processed to explode in a frame subsequent to the frame in which it is determined that the relative distance is greater than the maximum explosible distance r of the proximity fuse of the missile M and is less than the dangerous distance D.

Initiation and mode setting step S110 denotes a procedure in which the system 10 for simulating real-time visualizable electronic warfare is initiated and a mode is set. When the system 10 for simulating real-time visualizable electronic warfare is initiated, the system 10 is operated either by a preset initial value or in a manual/automatic mode. If the system 10 is set to the automatic mode, it is operated using a scheme for selecting a predefined scenario or a scheme for previously determining and automatically driving a scenario parameter. Further, if the system 10 is set to the manual mode, it is operated using a scheme for adjusting the aircraft with a joystick or the like.

Situation initiation step S120 denotes a procedure in which, as the aircraft A is flying around a dangerous region, the aircraft A is detected in the radar site of an enemy and the missile M for attacking the aircraft A is launched.

At the frame-based location calculation step S130, the location calculation unit 13 calculates the locations of the aircraft A and the missile M for each frame, and the display unit 14 represents the aircraft and the missile at the corresponding location coordinates for each frame depending on a preset frame rate, thus enabling the movement of the aircraft A and the missile M to be played in the form of a video.

At the missile explosion determination step S140, the precise tracking unit 15 determines whether the relative distance between the aircraft A and the missile M, calculated by the location calculation unit 13 for each frame, is greater than the maximum explosible distance r of the proximity fuse of the missile M based on the data of the missile M. If it is determined at the missile explosion determination step S140 that the relative distance between the aircraft A and the missile M is less than the maximum explosible distance r of the proximity fuse of the missile M in any specific frame, for example, a current frame, the proximity fuse of the missile M is operated in the frame, and thus the missile M is simulated to explode at step S150; otherwise the encounter or non-encounter determination step S160, which will be described later, is performed.

At the missile explosion determination step S140, if the relative distance between the aircraft A and the missile M is greater than the maximum explosible distance r of the proximity fuse of the missile M, the encounter or non-encounter determination step S160 is performed where it is determined whether the relative distance is less than the preset dangerous distance D. If the relative distance is greater than the maximum explosible distance r of the proximity fuse of the missile, but is less than the dangerous distance D, a possibility that the aircraft A and the missile M will encounter each other is high. Accordingly, it is determined whether the relative distance falls within the range of values greater than the maximum explosible distance r of the proximity fuse of the missile and less than the dangerous distance D, and thus it is determined whether the aircraft A and the missile M will encounter each other.

At the encounter or non-encounter determination step S160, the maximum explosible distance r of the proximity fuse of the missile is determined based on the data of the missile. However, the dangerous distance D may be determined by Equation (1) or Equation (2).

The sample coordinate calculation step S170 is performed when the relative distance between the aircraft A and the missile M is greater than the maximum explosible distance r of the proximity fuse of the missile and is less than the dangerous distance D. The precise tracking unit 15 samples the coordinates of the aircraft A and the missile M during an interval between the frames. At the sample coordinate calculation step S170, each interval between individual frames is sampled a preset number of times, and the coordinates of the aircraft A and the missile M at each sampling time are sampled, compared to a scheme in which the locations of the aircraft A and the missile M are calculated for each frame before the corresponding frame. For example, during an interval between a first frame in which the aircraft A and the missile M enter the range of the dangerous distance D, for example, a current frame, and a subsequent frame, sampling is performed 20 times, thus enabling a time interval in which the locations of the aircraft A and the missile M are sampled to be dense.

At the encounter possibility determination step S180, it is determined whether the relative distance between the locations of the aircraft A and the missile M, which are sampled at the sample coordinate calculation step S170, is less than or equal to the maximum explosible distance r of the proximity fuse of the missile. At the above-described encounter or non-encounter determination step S160, it is determined whether the relative distance between the aircraft A and the missile M, calculated for each frame, is less than the dangerous distance D. In contrast, at the encounter possibility determination step S180, a possibility that the aircraft A and the missile M will encounter is determined depending on the locations of the aircraft A and the missile M which are sampled during the interval between frames.

At the missile explosion processing step S190, if it is determined at the encounter possibility determination step S180 that the relative distance between the aircraft A and the missile M is less than or equal to the maximum explosible distance r of the proximity fuse, the missile M is processed to explode in the subsequent frame, and the explosion of the missile M is displayed.

In contrast, if it is determined at the encounter or non-encounter determination step S160 that the relative distance between the aircraft A and the missile M is not less than the dangerous distance D or at the encounter possibility determination step S180 that the relative distance between the sampled locations of the aircraft A and the missile M is greater than the maximum explosible distance r of the proximity fuse of the missile, scenario execution step S200 is performed. At the scenario execution step S200, when the missile M passes by the aircraft A due to jamming, the missile M is processed to explode in the air depending on the scenario of the scenario provision unit 11.

In accordance with the system and method for simulating real-time visualizable electronic warfare, having the above configuration, a frame-based discrete data processing scheme and a precise simulation processing scheme between frames are combined with each other, thus enabling the movement trajectories of two objects that are moving at high speeds during an interval between frames to be simulated without causing an error.

Further, the present invention is advantageous in that it can simulate the movement trajectories of two objects during an interval between frames without causing an error, thus determining whether an aircraft and a missile will encounter each other during an interval between frames.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for simulating real-time visualizable electronic warfare, the system simulating and displaying a situation in which a virtual aircraft and a virtual missile encounter each other, comprising:
   a location calculation unit for calculating location coordinates of the aircraft and the missile for each frame according to a display frame rate;
   a display unit for visualizing, for each frame, movement of the aircraft and the missile depending on the location coordinates thereof;

a precise tracking unit for, when a relative distance between the aircraft and the missile is less than a dangerous distance that is a distance in a current frame that deviates from an explosible distance of a proximity fuse of the missile upon making a transition from the current frame to a subsequent frame, dividing an interval between the current frame and the subsequent frame into a plurality of sub-intervals based on the display frame rate, and sampling locations of the aircraft and the missile; and a proximity fuse control unit for processing the missile to explode when a relative distance between the locations of the aircraft and the missile, sampled by the precise tracking unit, is less than or equal to a maximum explosible distance of the proximity fuse of the missile.

2. The system of claim 1, wherein the dangerous distance is determined by the following equation:

$$D = \frac{V_a + V_m}{FR} - r$$

where $V_a$ denotes a maximum speed of the aircraft in data, $V_m$ denotes a maximum speed of the missile in data, FR denotes the display frame rate, and r denotes the maximum explosible distance of the proximity fuse of the missile.

3. The system of claim 1, wherein the dangerous distance is determined by the following equation:

$$D = \frac{V_{cfa} + V_{cfm}}{FR} - r$$

where $V_{cfa}$ denotes a current speed of the aircraft, $V_{cfm}$ denotes a current speed of the missile, FR denotes the display frame rate, and r denotes the maximum explosible distance of the proximity fuse of the missile.

4. The system of claim 1, wherein the proximity fuse control unit approximates sample coordinates of the aircraft and the missile at a time at which the relative distance is a minimum, and other sample coordinates of the aircraft and the missile at a time adjacent to the time having the minimum relative distance, and then determines whether a distance between the trajectories of the aircraft and the missile is less than or equal to the maximum explosible distance of the proximity fuse of the missile.

5. The system of claim 1, further comprising a scenario provision unit having data and combat situation scenarios of the aircraft and the missile in conformity with a predetermined simulation scenario.

6. The system of claim 1, further comprising a user manipulation unit for manually controlling movement of the aircraft and the missile.

7. A method for simulating real-time visualizable electronic warfare, the method simulating and displaying a situation in which a virtual aircraft and a virtual missile encounter each other, comprising:

a) calculating and displaying locations of the aircraft and the missile for each frame according to a display frame rate, and then visualizing movement of the aircraft and the missile;

b) determining whether a relative distance between the aircraft and the missile in a current frame is greater than a maximum explosible distance of a proximity fuse of the missile;

c) if the relative distance is greater than the maximum explosible distance of the proximity fuse of the missile, determining whether the relative distance between the aircraft and the missile is less than a preset dangerous distance;

d) if the relative distance is greater than the maximum explosible distance of the proximity fuse of the missile and is less than the dangerous distance, dividing an interval between the current frame and a subsequent frame into preset sub-intervals, and sampling locations of the aircraft and the missile;

e) determining whether a relative distance between the sampled locations of the aircraft and the missile is less than or equal to the maximum explosible distance of the proximity fuse of the missile; and if it is determined at e) that the relative distance is less than or equal to the maximum explosible distance of the proximity fuse of the missile, processing the missile to explode in a frame subsequent to the frame in which it is determined that the relative distance is greater than the maximum explosible distance of the proximity fuse of the missile and is less than the dangerous distance.

8. The method of claim 7, further comprising simulating the missile to explode if it is determined at b) that the relative distance between the aircraft and the missile is not greater than the maximum explosible distance of the proximity fuse of the missile.

9. The method of claim 7, wherein the dangerous distance is determined by the following equation:

$$D = \frac{V_a + V_m}{FR} - r$$

where $V_a$ denotes a maximum speed of the aircraft in data, $V_m$ denotes a maximum speed of the missile in data, FR denotes the display frame rate, and r denotes the maximum explosible distance of the proximity fuse of the missile.

10. The method of claim 7, wherein the dangerous distance is determined by the following equation:

$$D = \frac{V_{cfa} + V_{cfm}}{FR} - r$$

where $V_{cfa}$ denotes a current speed of the aircraft, $V_{cfm}$ denotes a current speed of the missile, FR denotes the display frame rate, and r denotes the maximum explosible distance of the proximity fuse of the missile.

11. The method of claim 7, further comprising processing the missile to explode in air in conformity with a scenario if it is determined at c) that the relative distance between the aircraft and the missile is equal to or greater than the preset dangerous distance, or at e) that the relative distance between the sampled locations of the aircraft and the missile is greater than the maximum explosible distance of the proximity fuse of the missile.

* * * * *